J. T. HOWARD.
CHICKEN FEEDER AND EXERCISER.
APPLICATION FILED AUG. 2, 1913.
1,099,443.
Patented June 9, 1914.
2 SHEETS—SHEET 1.
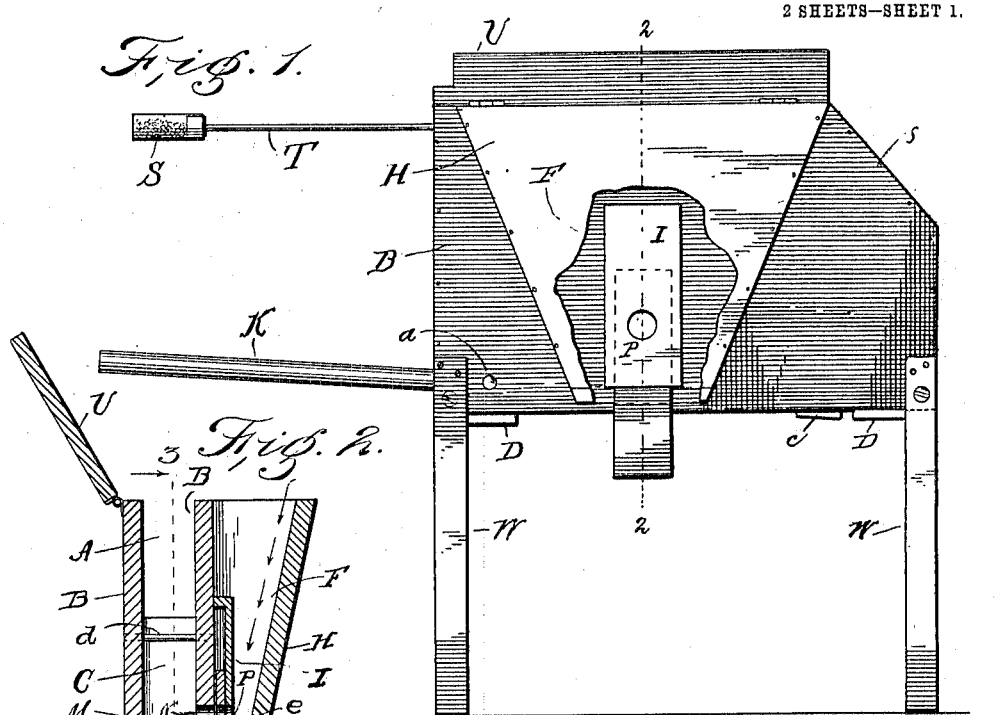
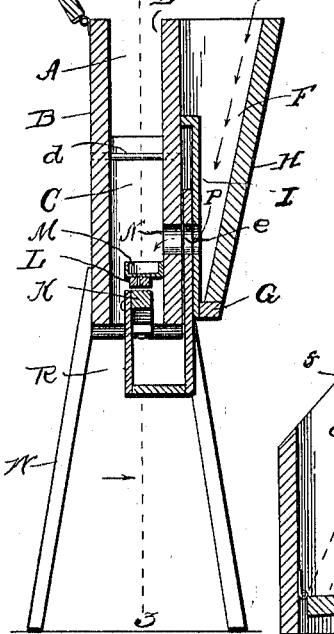
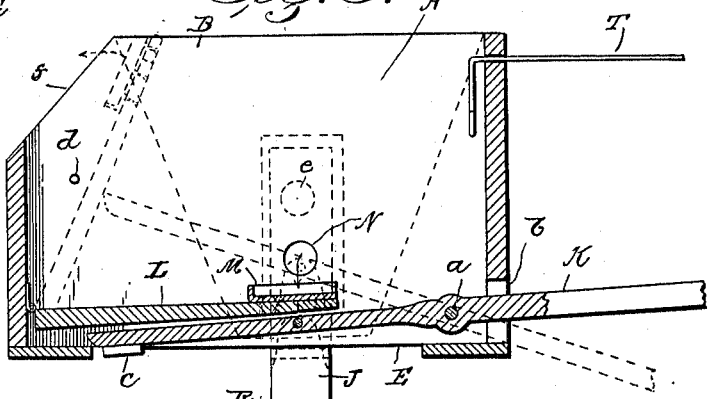
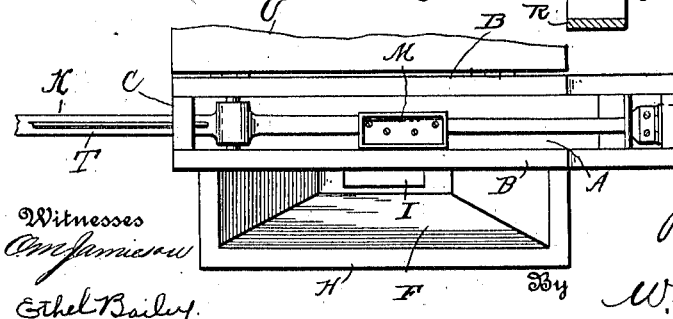

J. T. HOWARD.
CHICKEN FEEDER AND EXERCISER.
APPLICATION FILED AUG. 2, 1913.
1,099,443.
Patented June 9, 1914.
2 SHEETS—SHEET 2.
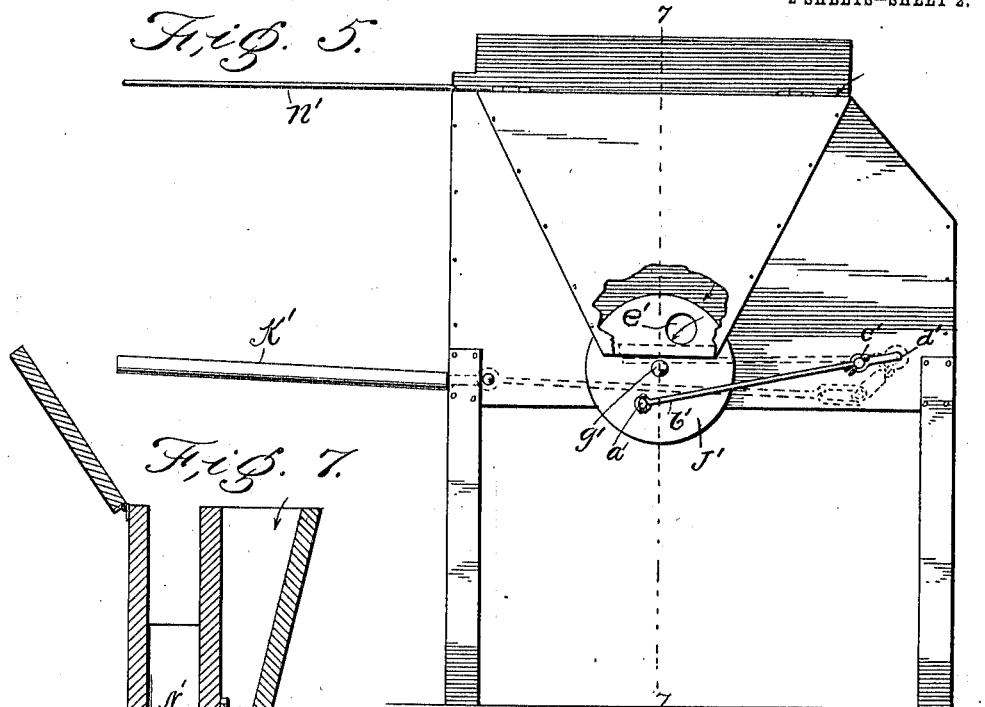
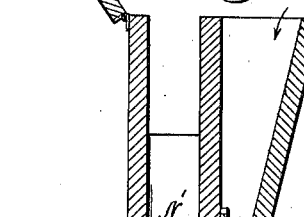
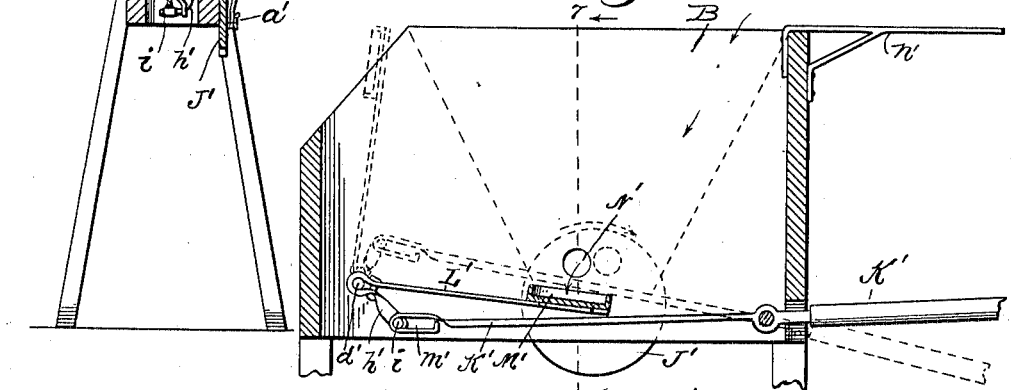
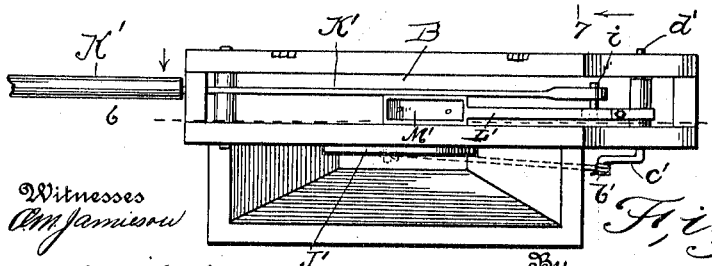

UNITED STATES PATENT OFFICE.

JAMES T. HOWARD, OF WARREN, MARYLAND.

CHICKEN FEEDER AND EXERCISER.

1,099,443.　　　　Specification of Letters Patent.　　Patented June 9, 1914.

Application filed August 2, 1913. Serial No. 782,683.

*To all whom it may concern:*

Be it known that I, JAMES T. HOWARD, a citizen of the United States, residing at Warren, in the county of Baltimore and State of Maryland, have invented a certain new and useful Chicken Feeder and Exerciser, of which the following is a specification.

This invention relates to poultry feeding devices and has for its object to provide a device of the character named of simple and durable construction and easy of operation, in which the feed is stored and from which it is discharged and distributed by the exertion of the poultry, and it consists in the parts and combinations of parts hereinafter described and claimed.

In the accompanying drawings forming a part of this specification, Figure 1 is a side elevation, partly broken away, of my improved feeder. Fig. 2 is a transverse vertical section on the line 2—2, Fig. 1. Fig. 3 is a longitudinal vertical section on the line 3—3, Fig. 2. Fig. 4 is a plan view with the lid or cover open and partly broken away. Fig. 5 is a side elevation, partly broken away, of a modified form of the device. Fig. 6 is a longitudinal vertical section on the line 6—6, Fig. 8. Fig. 7 is a transverse vertical section on the line 7—7, Fig. 5. Fig. 8 is a plan view with the lid or cover removed.

Similar letters refer to similar parts throughout all the views.

In carrying out my invention I provide a narrow chamber or compartment A having side walls B, end walls C, and a bottom D in which is formed an elongated opening E. To one of the side walls of the compartment A is secured a hopper F the end walls of which converge downwardly toward its bottom G, and the exterior wall H of which preferably inclines toward said bottom, as best shown in Fig. 2, thereby forming a narrow wedge-shaped compartment to receive the feed and to insure the gravitation of the same to the discharge opening therefor. Also within the hopper a guide I is provided to receive the cut off valve J, the purpose and operation of which will be hereinafter described.

Near one end of the chamber or compartment A, a lever K is pivoted, as at *a*, one end of which extends through a slot *b* in the end wall and the other end of which terminates at a point within the chamber or compartment at a distance from the other end wall thereof and rests on the bottom of the compartment. See Fig. 3. The inner end of the lever is free to oscillate or swing between the walls of the compartment and carries a weight *c* to normally hold it in its lowered or set position. At the opposite end of the compartment A a lever L is pivotally attached to the end wall so as to be free to swing upwardly until arrested by a stop pin *d* secured in the side walls and extending across the compartment, and its downward movement is limited or arrested by the lever K upon which it normally rests. A pan or receptacle M is secured on the end of the lever L in position to receive the flow of feed from the hopper through the opening N in the side wall. The cut off valve J is formed with an opening *e* of a size corresponding to the opening N and an opening P formed in the wall of the guide I, said opening *e* being so positioned as to normally register with the said openings N and P when the lever K is in its normal or set position, as shown in full lines in Figs. 3 and 4, and to cover said opening when the lever K is pressed downward and the valve J thereby raised to its highest position in the guide I. The valve J is fixed to an L-shaped hanger or stirrup R pivotally attached to and suspended from the lever K at such a distance from the fulcrum of said lever as to cause the valve to slide upwardly in the guide to cover the openings N, P, and to cause the opening *e* to register with said opening when the outer end of the lever K is depressed. The depression of the lever causes its inner end to engage and lift the lever L until its upward movement is arrested by the pin *d*.

A rod T is inserted in an opening therefor in the end wall near the top of the compartment B and has its end bent or otherwise formed so as to prevent its accidental withdrawal and on its outer end carries a bait holder consisting, in this instance, of a glass vial or receptacle S within which grain or any other suitable bait is placed.

A lid or cover U is hinged to the top of device and fully covers the grain or feed hopper and all of the compartment B excepting that portion at one end which is chamfered off, as at *f*, to provide an opening through which the feed is thrown by the lever L as will be explained.

Legs W are provided to support the device at a suitable height to accommodate the size of the breed of poultry to be fed.

In operation the hopper is supplied with grain or other feed and the bait holder supplied with bait. The device is then located in the poultry house or run with the parts of the device in their normal position and in which position the grain or feed escapes through the openings in the guideway, the valve, and the opening in the side wall and falls onto the pan or receptacle carried by the lever L, so that when poultry, attracted by the bait, hops onto the lever K in an effort to obtain the same their weight will depress the lever suddenly and cause its inner end to engage and quickly swing the lever L upwardly with considerable force against the pin $d$, thus throwing the feed contained by the pan or receptacle M out through the opening in the chamfered end of the compartment and widely scattering the same. As the lever K is swung upwardly it carries the valve up in the guide I and closes the opening in the guide and cuts off the supply of grain or feed therethrough, and the weight $c$ returns the lever K to its normal position as soon as it is relieved of the weight of the chicken.

In the modification shown in Figs. 5, 6, 7, and 8 the valve J′ is shown as disk shaped and with an opening $e'$ therein near its periphery, said disk being located in an opening or slot formed in the end walls and bottom of the hopper and mounted on a shaft or axle $g'$ secured in the wall of the compartment, so that opening $e'$ therein may register with the feed opening N′. A crank pin $a'$ on the disk or valve is connected by a rod $b'$ to a crank arm $c'$ carried by a shaft $d'$ having its bearings in the walls of compartment B. To the shaft $d'$ is clamped the end of an arm L′ the other end of said arm carrying a pan or receptacle M′ the latter being so positioned as to lie immediately below the opening N′ and in position to receive the grain or feed discharging through the same from the hopper. To the arm L′ a crank arm is secured in any desired manner and, in this instance, by bending the end of the arm, as at $h'$ securing a pin, $i$ thereto which is inserted in a slot $m'$ formed in the end of a lever K′ which is pivotally mounted in the compartment B and extends through a slot or opening in the end wall thereof. The bait in the modified form described may be attached to the rod $n'$ which is suitably, and preferably detachably, secured to the wall of the compartment B.

In the modification the weight of the fowl on the lever K′ depresses the lever and gives the shaft $d'$ a partial revolution, thereby lifting or swinging the lever L′ and causing the feed in the pan or receptacle to be thrown out through the opening in the top of the compartment and widely scattered.

The depression of the lever, acting through the crank arm $c'$ and rod $b'$ causes or gives a partial revolution to the disk valve J′ and covers the discharge opening N′, stopping the escape of feed until the weight of the fowl is removed, when the parts resume their normal set position.

Having thus described my invention what I claim is:

1. A poultry feeding device comprising a hopper having a discharge opening, a valve for covering and uncovering said opening, a pivoted arm, a receptacle arranged on the free end of said arm to receive the feed discharged through said opening, a lever for operating said valve and imparting a swinging movement to said arm, said lever being operable by the weight of a fowl.

2. A poultry feeding device comprising a hopper having a discharge opening, a valve for covering and uncovering said opening, a pivoted arm carrying a receptacle to receive the discharge from said opening, a pivoted lever adapted to be operated by the weight of a fowl for operating said valve and arm, and means for suspending bait above one end of said lever.

3. A poultry feeding device comprising a hopper having a discharge opening, a valve for covering and uncovering said opening, an arm pivotally supported at one end, a receptacle on the free end of said arm, a lever engaging said arm to impart a vertically swinging movement thereto, and means connecting said lever and valve, whereby the operation of said lever operates said arm and valve.

4. A poultry feeding device comprising a hopper having a discharge opening, a valve for covering and uncovering said opening, a pivoted arm, a receptacle mounted on the free end of said arm to receive the discharge from said hopper, a lever adapted to engage said pivoted arm, and means connecting said lever and valve, whereby the movement of said lever swings said arm on its pivot to scatter the feed and to operate the valve to close the hopper discharge opening.

5. A poultry feeder comprising a hopper having a lateral discharge opening, a valve for said opening, an oscillatory receptacle for receiving the discharge from said opening, and means operably by the weight of a fowl for operating said valve and imparting a swinging or oscillating movement to said receptacle.

In testimony whereof, I affix my signature, in the presence of two witnesses.

JAMES T. HOWARD.

Witnesses:
J. T. BURNS,
CHAS. A. TAWNEY.